US007610761B2

(12) United States Patent
Carroni et al.

(10) Patent No.: US 7,610,761 B2
(45) Date of Patent: Nov. 3, 2009

(54) METHOD AND DEVICE FOR THE COMBUSTION OF HYDROGEN IN A PREMIX BURNER

(75) Inventors: Richard Carroni, Niederrohrdorf (CH); Timothy Griffin, Ennetbaden (CH); Dieter Winkler, Lauchringen (DE)

(73) Assignee: ALSTOM Technology Ltd., Baden (CH)

( * ) Notice: Subject to any disclaimer, the term of this patent is extended or adjusted under 35 U.S.C. 154(b) by 14 days.

(21) Appl. No.: 11/859,912

(22) Filed: Sep. 24, 2007

(65) Prior Publication Data

US 2008/0092513 A1 Apr. 24, 2008

Related U.S. Application Data

(63) Continuation of application No. PCT/EP2006/060518, filed on Mar. 7, 2006.

(30) Foreign Application Priority Data

Mar. 23, 2005 (CH) .................................. 00506/05

(51) Int. Cl.
*F02C 7/22* (2006.01)
*F02C 7/26* (2006.01)

(52) U.S. Cl. .......................................... 60/777; 60/723

(58) Field of Classification Search ................... 60/777, 60/723, 39.822
See application file for complete search history.

(56) References Cited

U.S. PATENT DOCUMENTS 4,378,336 A 3/1983 Yoon
5,165,224 A * 11/1992 Spadaccini et al. ............ 60/780
5,190,453 A 3/1993 Le et al.
5,207,053 A * 5/1993 Spadaccini et al. ............ 60/780
5,235,804 A * 8/1993 Colket et al. .................. 60/780
5,569,020 A * 10/1996 Griffin et al. ................... 431/7

(Continued)

FOREIGN PATENT DOCUMENTS

EP 0321809 6/1989

(Continued)

OTHER PUBLICATIONS

Search Report for Swiss Patent App. No. 00506/05 (Dec. 19, 2005).

(Continued)

*Primary Examiner*—William H Rodriguez
(74) *Attorney, Agent, or Firm*—Cermak Kenealy Vaidya & Nakajima LLP; Adam J. Cermak

(57) ABSTRACT

A method and a device for producing an ignitable fuel/air mixture includes a fuel fraction which is hydrogen or a gas mixture containing hydrogen and which is burnt in a burner arrangement for driving a thermal engine, in particular a gas turbine plant. An exemplary method includes combining a fuel flow and of an air flow, so as to form a fuel/air mixture flow, and providing a further air flow, catalyzing part of the fuel/air mixture flow, so as to form a partly catalyzed fuel/air mixture, during an exothermal catalytically assisted reaction of the fuel, the released heat of which is utilized at least partially for heating the further air flow, admixing the heated further air flow to the partly catalyzed fuel/air mixture, so as to form an ignitable fuel/air mixture, and igniting and combusting the ignitable fuel/air mixture.

22 Claims, 3 Drawing Sheets

U.S. PATENT DOCUMENTS

| | | | | |
|---|---|---|---|---|
| 5,810,577 | A | 9/1998 | Ledjeff | |
| 6,748,745 | B2 * | 6/2004 | Ul Karim et al. | 60/777 |
| 6,923,001 | B2 * | 8/2005 | Laster et al. | 60/723 |
| 7,421,844 | B2 * | 9/2008 | Griffin et al. | 60/777 |
| 7,444,820 | B2 * | 11/2008 | Colket, III | 60/777 |
| 2002/0197578 | A1 | 12/2002 | Smith et al. | |
| 2003/0108839 | A1 | 6/2003 | Watson et al. | |
| 2006/0064987 | A1 * | 3/2006 | Veninger | 60/777 |
| 2006/0225429 | A1 * | 10/2006 | Szedlacsek et al. | 60/777 |
| 2006/0248872 | A1 * | 11/2006 | Bachovchin et al. | 60/39.12 |
| 2007/0006595 | A1 * | 1/2007 | Bruck et al. | 60/777 |
| 2007/0089417 | A1 * | 4/2007 | Khanna | 60/723 |
| 2008/0110172 | A9 * | 5/2008 | Bruck | 60/723 |

FOREIGN PATENT DOCUMENTS

| | | |
|---|---|---|
| EP | 0780629 | 6/1997 |
| EP | 1070915 | 1/2001 |
| EP | 1179709 | 2/2002 |
| WO | WO93/17279 | 9/1993 |
| WO | WO2004/020902 | 3/2004 |
| WO | WO2004/020905 | 3/2004 |
| WO | WO2004/094909 | 11/2004 |
| WO | WO2006/100176 | 9/2006 |

OTHER PUBLICATIONS

International Search Report for PCT Patent App. No. PCT/EP2006/060518 (May 19, 2006).

International Preliminar Report on Patentability for PCT Patent App. No. PCT/EP2006/060518 (Jul. 2, 2007).

* cited by examiner

METHOD AND DEVICE FOR THE COMBUSTION OF HYDROGEN IN A PREMIX BURNER

This application is a Continuation of, and claims priority under 35 U.S.C. § 120 to, International application no. PCT/EP2006/060518, filed 7 Mar. 2006, and claims priority therethrough under 35 U.S.C. § 119 to Swiss application no. 00506/05, filed 23 Mar. 2005, the entireties of both of which are incorporated by reference herein.

BACKGROUND

1. Field of Endeavor

The invention relates to a method and a device for producing an ignitable fuel-air mixture, the fuel fraction of which consists of hydrogen or of a gas mixture containing hydrogen and which is burnt in a burner arrangement for driving a thermal engine, in particular a gas turbine plant.

2. Brief Description of the Related Art

Motivated by the virtually worldwide effort to reduce the emission of greenhouse gases into the atmosphere, not least set down in what is known as the Kyoto Protocol, the emission of greenhouse gases which is to be expected in 2010 is to be reduced to the same level as in 1990. Major endeavors are required to implement this aim, particularly to reduce the contribution of anthroprogen-induced $CO_2$ releases into the atmosphere. About one third of the $CO_2$ released into the atmosphere by humans is attributable to energy generation, in which mostly fossil fuels are burnt in power plants for current generation. Particularly due to the use of modern technologies and because of additional political framework conditions, a considerable saving potential to avoid a further-increasing $CO_2$ emission can be seen in the energy-generating sector.

One possibility, known per se, which can be implemented in technical terms to reduce the $CO_2$ emission in combustion power stations is to extract carbon from the fuels to be burnt, even before the fuel is introduced into the combustion chamber. This presupposes corresponding fuel pretreatments, such as, for example, the partial oxidation of the fuel with oxygen, and/or a pretreatment of the fuel with steam. Fuel pretreated in this way has high fractions of $H_2$ and CO and, depending on the mixture ratios, have calorific values which, as a rule, lie below those of natural gas. Depending on their calorific value, gases synthetically produced in this way are designated as Mbtu or Lbtu gases, which are not readily suitable for use in conventional burners designed for the combustion of natural gases, such as may be gathered, for example, for EP 0 321 809 B1, EP 0 780 629 A2, WO 93/17279, and EP 1 070 915 A1. All the above publications describe burners of the premix combustion type, in which, in each case, a swirl flow consisting of combustion air and of admixed fuel is generated, which widens conically in the flow direction, and which, in the flow direction, after emerging from the burner, as far as possible after a homogenous air/fuel mixture has been achieved, becomes unstable due to the increasing swirl and changes into an annular swirl flow with backflow in the core.

Depending on the burner concept and as a function of the burner power, the swirl flow of liquid and/or gaseous fuel, which is formed inside the premix burner, is fed in to form as homogenous a fuel/air mixture as possible. If, however, as mentioned above, it is appropriate, for the purposes of reduced pollutant, in particular $CO_2$ emission, to employ synthetically prepared gaseous fuels alternatively to or in combination with the combustion of conventional fuel types, then special requirements arise with regard to the design of conventional premix burner systems. Thus, synthesis gases, in order to be fed into burner systems, require many times more fuel volume flow than comparable burners operating with natural gas, thus resulting in markedly different flow momentum conditions. On account of the high fraction of hydrogen in the synthesis gas and the associated low ignition temperature and high flame velocity of the hydrogen, there is a high tendency of the fuel to react, which leads to an increased flashback risk. In order to avoid this, it is appropriate, as much as possible, to reduce the average dwell time of ignitable fuel/air mixture within the burner.

If, furthermore, the intention is to use pure hydrogen as fuel instead of synthesis gases, which, for example, are obtained by coal gasification and typically have a mixture of hydrogen, carbon monoxide, and nitrogen in a mixture ratio of 30:60:10, this being against the background of combustion which is, as much as possible, of reduced emission or is emission-free, then the problems indicated above apply in even more intensified form, especially since hydrogen has a flame velocity which lies by an order to magnitude above that of natural gas and is about 45% higher than the flame velocity of undiluted synthesis gases, such as are also obtained within oil gasification. In addition, hydrogen as fuel has a much greater spontaneous ignitability or reactivity, for example than that of natural gas, so that, with the above hydrogen-specific combustion qualities taken together, the production of an ignitable fuel/air mixture consisting of hydrogen under conditions, such as prevail for the firing of gas turbine plants, is extremely difficult, yet it is still important to avoid, in particular, premature ignitions of the hydrogen before a homogenously intermixed fuel/air mixture for the firing a combustion chamber in order to drive a gas turbine plant, has been formed. In the case of an insufficient intermixing of the fuel/air mixture, pronounced temperature peaks and associated high nitrogen oxide emissions occur on account of combustion inhomogeneities.

SUMMARY

One of numerous aspects of the present invention includes specifying a method and a device for producing an ignitable fuel/air mixture, the fuel fraction of which consists of hydrogen or of a gas mixture containing hydrogen and which is burnt in a burner arrangement for driving a thermal engine, in particular a gas turbine plant, in such a way that the aforementioned disadvantages with regard to the related art, are to be avoided. In particular, it is appropriate to provide structural and methodological framework conditions under which a reliable and complete formation of a fully intermixed fuel/air mixture is ensured, preferably pure hydrogen being used as fuel, in order to ensure combustion which, as much as possible, has reduced pollutants or is pollutant-free. In particular, in this context, it is appropriate to take into account the special ignition and combustion properties of hydrogen, as explained initially, in order ultimately to afford the possibility of using hydrogen as a fuel for supplying premix burners known per se.

Features advantageously developing the principles of the present invention may be gathered from the description, particularly with reference to the exemplary embodiments.

According to another aspect of the present invention, fuel, preferably consisting of pure hydrogen for firing a burner arrangement for driving a thermal, in particular a gas turbine plant, is catalytically pretreated and the fuel/air mixture is formed, before entry into the combustion chamber, catalytic pretreatment already being known from publications which provide the combustion of fossil fuels for the drive of gas turbine plants, exhaust gases virtually free of nitrogen oxides being obtained in this case. Such catalytic pretreatment of the fuel with subsequent combustion is described in the literature and provides for catalysis of part of the fuel/air mixture to be fed to the combustion operation, under fuel-rich mixture conditions, with subsequent combustion of a depleted partly catalyzed fuel/air mixture within a combustion chamber. A burner concept of this type may be gathered, for example, from WO 2004/094909.

The inventors herein recognized that the principle of catalytic pretreatment of the hydrogen as fuel by fuel-rich oxidation, that is to say the existing oxygen fraction typically amounts to between 20 and 50% of that oxygen quantity which would be necessary for a complete oxidation of the hydrogen present, fulfills the aim of using hydrogen as fuel and of ultimately forming an ignitable hydrogen/air mixture which can be ignited in a controlled way in the combustion chamber. The proportionally occurring catalytic oxidation of hydrogen results in water and gaseous nitrogen as oxidation products, by which the nonoxidized fraction of hydrogen is diluted to an extent such that the partly catalyzed gas mixture formed is suitable for further intermixing with air, without in this case experiencing premature ignitions. In addition to the diluting action which is caused by the formation of water and nitrogen and which exerts an action inhibiting the high ignitability of hydrogen and therefore reduces the reactivity of the hydrogen and markedly diminishes the risk of spontaneous ignitions, the heat released due to the exothermal chemical reaction contributes to the heating of the partly catalyzed hydrogen/air mixture which is heated to temperatures typically of between 700° C. and 1000° C. and is subsequently mixed with an air stream, likewise heated by the heat released from catalyzed oxidation, to form a depleted hydrogen/air mixture, and is ultimately ignited within a combustion chamber.

Thus, another aspect of the present invention includes a method for producing an ignitable fuel/air mixture, the fuel fraction of which consists of hydrogen or of a gas mixture containing hydrogen and which is burnt in a burner arrangement for driving a thermal engine, in particular a gas turbine plant, having the following method steps:

In a first step, hydrogen as fuel or a hydrogen-containing gas mixture as fuel is combined or mixed with air so as to form a fuel/air mixture flow. For a simplified further illustration of the idea of the solution, it may be assumed that the fuel used is pure hydrogen, although the descriptions herein likewise apply to the use of a hydrogen-containing gas mixture, for example synthesis gases, as fuel. The hydrogen/air mixture flow described above is produced with a high hydrogen fraction, that is to say, the oxygen fraction in the hydrogen/air mixture flow amounts to only 20 to at most 50% of that oxygen quantity which would be necessary in order to burn or to oxidize all the hydrogen, and it is therefore a “rich fuel/air mixture”.

In addition to the “rich hydrogen/air mixture flow”, a separate further air flow is provided, which is also to be dealt with in detail below.

The “rich” hydrogen/air mixture flow explained above is fed for catalysis, in which considerable fractions of the hydrogen contained in the hydrogen/air mixture flow are oxidized into water, while at the same time, on account of the exothermally occurring chemical reaction, heat is released, by which not only the partly catalyzed hydrogen/air mixture formed during catalysis is heated to temperatures of between 700 and 1000° C. and the water possesses, as steam, a diluting action on the partly catalyzed hydrogen/air mixture formed, but, moreover, the further air flow is also heated, which is coupled thermally to the partly catalyzed hydrogen/air mixture formed during catalysis. Only after the catalysis step is there an admixing of the heated further air flow to the partly catalyzed hydrogen/air mixture so as to form an ignitable fuel/air mixture which is ignited and burnt within a combustion chamber.

Moreover, owing to the pretreatment and combustion of a hydrogen/air mixture, the combustion-induced nitrogen oxide emission can be reduced considerably, and, on the one hand, this derives from the fact that part of the hydrogen is oxidized at temperatures which lie well below those temperatures at which thermal nitrogen oxide formation can occur, while, on the other hand, a rapid and full intermixing of the partly catalyzed hydrogen/air mixture with the heated further air flow contributes to a complete burn-up of the hydrogen within the combustion chamber. Finally, the water which occurs during the catalyzation of hydrogen, and which, in the form of steam, can dilute the remaining residual hydrogen fraction on account of the prevailing temperatures, contributes to preventing or reducing further nitrogen oxide formation.

In addition to the initially mentioned provision of the air flow which, on the one hand, serves with hydrogen for forming a hydrogen/air mixture flow and, on the other hand, after corresponding heating, is admixed as a further air flow to the partly catalyzed hydrogen/air mixture, it may be noted that this air flow is provided by a compressor unit as a precompressed air flow with temperatures of at least 350° C.

Particular care is needed in designing the catalyzer unit in which the hydrogen/air mixture flow rich in hydrogen is catalyzed at least in parts to form water. However, in terms of the abovementioned publication WO 2004/094909, with reference to the catalyzer unit described in it, which provides essentially a carrier structure which is perforated in a matrix-like manner and is pierced by a multiplicity of parallel-oriented passage ducts, of which a first group of passage ducts is lined on the wall inside with a catalyst material and a second group of passage ducts consists of essentially chemically inert material, modification is required in order to pretreat the ignitable hydrogen/air mixture correspondingly in a chemical way.

Thus, it is appropriate to feed the prepared hydrogen/air mixture flow, preferably by dividing it into a multiplicity of individual part streams, into those very passage ducts of the first group, the inner walls of which are lined with catalyst material. An overheating of the carrying structure of the catalyzer unit is avoided in that only a predeterminable fraction of hydrogen can be oxidized with oxygen under hydrogen-rich mixture conditions within the hydrogen/air mixture flow so as to release heat and to form water.

In this case, it is the oxygen fraction which can limit the release of heat by the reaction partners, so that the heat quantity released during the reaction taking place exothermally is selected, taking into account the thermal load-bearing capacity of the material of which the carrying structure of the catalyzer unit is formed. Moreover, the passage ducts which are to be assigned to the second group and through which the, in each case, fuel-free or hydrogen-free air flows are led, serve as cooling ducts, by means of which, additionally, the carrying structure can be kept within a thermally stable range. Conventionally, the temperatures occurring during catalysis can be kept below 1000° C., such as, in particular, in those instances in which the carrying structure consists of metallic materials. If, by contrast, ceramic materials, such as, for example, corodierite, are used as material for the carrying structure, the maximum loading temperatures rise to a maximum of 1300° C. It is clear that, for the reliable operation of a catalyzer of this type, sufficiently good thermal coupling must be ensured in each case between the passage ducts of the first group and of the second group, in order, on the one hand, to achieve the desired cooling effect to the carrying structure and, on the other hand, to heat as effectively as possible the air flows led through the passage ducts of the second group, so that, after the passage of the multiplicity of heated part air streams through the passage ducts of the second group, intermixing can take place with the multiplicity of likewise heated part streams of the partly catalyzed hydrogen/air mixture, so as to form a hot ignitable hydrogen/air mixture.

Principles of the present invention provide alternative method variants for the intermixing of the multiplicity of part streams emerging, in each case, from the passage ducts. A simplest embodiment for intermixing utilizes the high packing density of the outlet orifices, arranged in one plane, of all the passage ducts which are combined within the carrying structure and which preferably in each case have a hexagonal flow cross section and therefore form a hexagonal honeycomb pattern. By providing very thin intermediate walls between two passage ducts running directly adjacently to one another, the individual part streams, after passing through the passage ducts, experience effective mutual intermixing. In order to obtain as high a degree of intermixing as possible of the part streams emerging from the passage ducts, the passage ducts of the first and the second group are arranged exactly such that passage ducts running directly adjacently to one another have different group affiliation.

A further particularly preferred design variant of the mutual intermixing of the part streams emerging from the passage ducts of both groups provides for jointly combining, in a spatially separated flow region, the part streams which in each case pass through the passage ducts of the first group and in each case contain the partly catalyzed hydrogen/air mixture, whereas the part streams passing through the passage ducts of the second group are combined in a flow region located somewhere else. In contrast to the mixed variant described above, in which in each case a multiplicity of part streams are intermixed with one another, the second preferred design variant provides for swirling the heated air flow or partly catalyzed hydrogen/air mixture flow emerging from the respective flow regions, as unitary flows in each case, using additional vortex-generators, for the purpose of mutual intermixing. Alternatively or in combination, additionally swirl-generators downstream of the respective flow regions may be provided, by which the two separated substance streams are intermixed with one another and in the form, as stable a swirl flow as possible, enter the region of the combustion chamber in which the swirl flow bursts apart to form a spatially stable backflow bubble.

Various flow routings are appropriate for combining the two substance streams emerging from the respective separated flow regions. A first flow routing provides for the emergence of partly catalyzed hydrogen/air mixture in the form of an axially propagated unitary substance stream which is enveloped annularly by a heated air flow which mates with it from outside in the form of a ring and which is suitably propagated axially as a swirl flow. The opposite case may also be envisaged, in which an axially propagated heated air stream is enveloped from outside by an annular hydrogen/fuel mixture flow which is propagated further in the form of a swirl flow in the direction of the combustion chamber so as to form a homogeneously intermixed hydrogen/fuel mixture.

Depending on the mix requirements and on requirements as regards a swirl flow which is formed in the stable way, suitable vortex-generators and swirl-generators must be provided in the flow path of the two substance streams. More detailed particulars may be gathered from the further description with reference to the relevant exemplary embodiments.

It is likewise appropriate, as a further alternative, to cause the partly catalyzed hydrogen/fuel mixture to emerge from the corresponding flow region, instead of as a unitary flow, in the form of a multiplicity of newly formed individual flows which are surrounded overall by an annular heated air flow surrounding the multiplicity of individual flows.

In addition to an axially propagated unitary flow, consisting, for example, of a partly catalyzed hydrogen/fuel mixture, parts of this flow may be fed into the radially outer flow regions at an angle unequal to 0° with respect to the main flow direction. The degree of intermixing of the hydrogen/fuel mixture flow which is formed can be improved considerably by this measure.

To implement the method described above and the method variants afforded thereby, it is appropriate to specify a suitable device, by which it is possible to produce an ignitable hydrogen/air mixture for operating a burner of a thermal engine, in particular a gas turbine plant. The device has at least one catalyzer unit which is arranged upstream of the burner and which has a multiplicity of identically oriented passage ducts, of which a first group is provided on the wall inside with a catalyst material and a second group consists of chemically largely inert material. Furthermore, a first infeed for introducing a hydrogen/air mixture into the passage ducts of the first group and a second infeed for introducing air into the passage ducts of the second group, are provided. Downstream of the catalyzer unit, the burner is followed by a combustion chamber, in which the ignitable hydrogen/air mixture is ignited so as to form as spatially stable a flame as possible.

Since, in contrast to comparable devices, the devices to allow the combustion of hydrogen or a hydrogen/containing gas mixture as fuel, the device is distinguished, according to the solution, in that the first infeed has at least two chambers separated from one another, of which the first chamber provides a fuel supply line and the second chamber an air supply line, and in that the first and the second chamber in each case provide connecting lines which issue in each case in pairs in the passage ducts of the first group.

By virtue of the two-chamber system proposed according to the present invention, it is possible directly to carry out the supply of fuel or of hydrogen into the passage ducts, provided in each case with catalyst material, of the catalyzer unit, along which the hydrogen propagating in the passage ducts is intermixed with the heated air flow likewise issuing directly into the respective passage ducts, the hydrogen/air mixture flow formed within the passage ducts having a relatively high hydrogen fraction, so that, because of a predetermined lack of oxygen, only part of the hydrogen present is oxidized catalytically into water.

The two-chamber system preceding the catalyst unit in the flow direction ensures an infeed, separated in a fluidtight manner, of hydrogen and of air into the respective passage ducts of the first group, which are lined with catalyst material, and ensures that there is no risk of spontaneous ignition of the hydrogen upstream of the catalyzer unit. As regards the design of the two-chamber system and of the catalyzer unit combined with it, along with further components following the catalyzer unit in the flow direction, the description of the exemplary embodiments may be referred to below, with reference to the figures.

BRIEF DESCRIPTION OF THE DRAWINGS

Exemplary embodiments embodying principles of the present invention are described below by way of example, without any restriction in the general idea of the invention, with reference to the drawings in which.

DETAILED DESCRIPTION OF EXEMPLARY EMBODIMENTS

Figure 1:
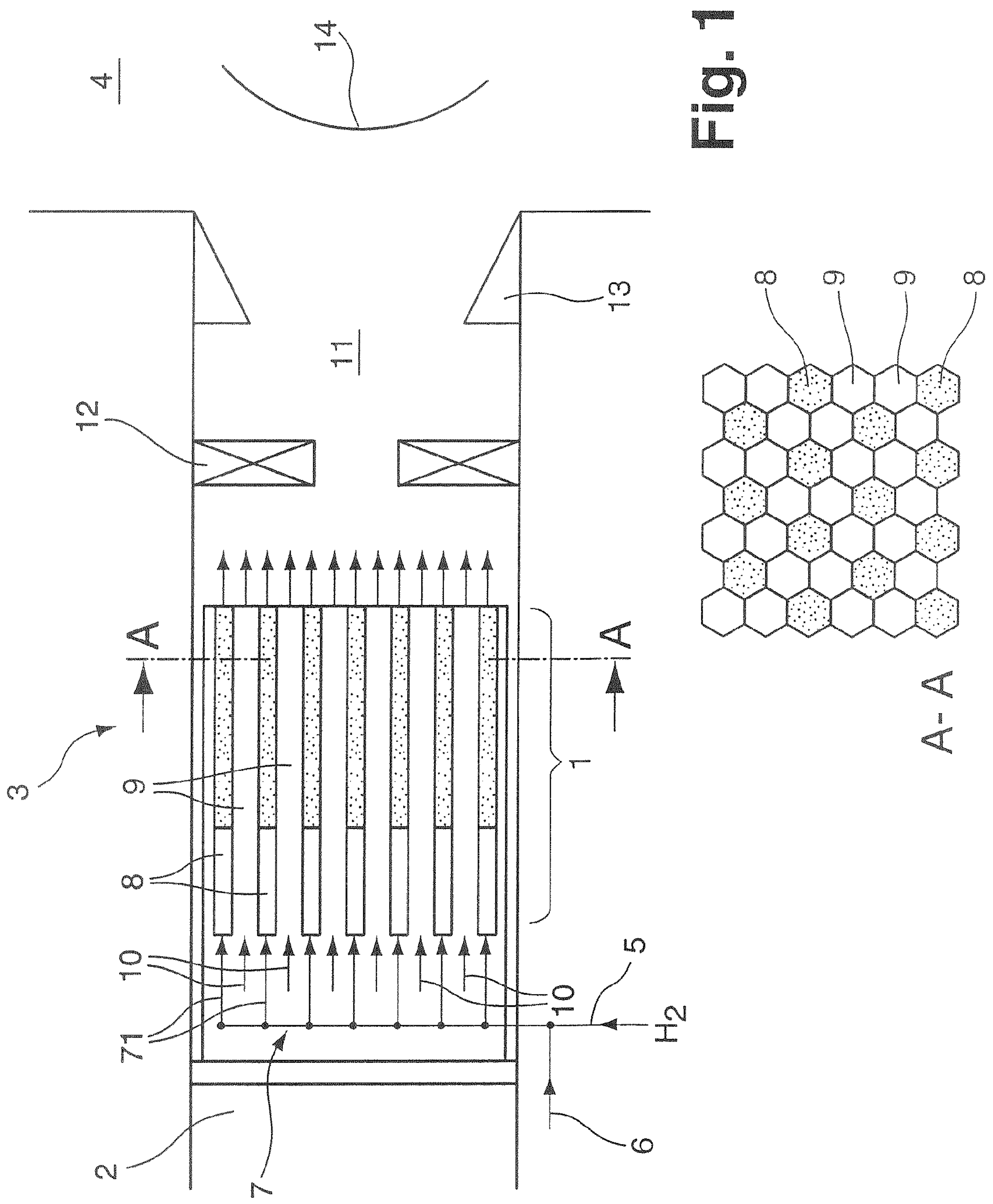
FIG. 1 shows a diagrammatic burner set-up with a catalyzer unit.

FIG. 1 provides a diagrammatic longitudinal sectional illustration through a burner arrangement with a catalyzer unit 1, which is arranged in the flow inlet region 2 of the burner 3 at which a combustion chamber 4 is provided downstream. To operate the burner arrangement, illustrated in FIG. 1, with hydrogen as fuel, a fuel supply line 5, and an air supply line 6 are provided, which issue jointly into an infeed 7. The infeed 7 has connecting lines 71 issuing into passage ducts 8 which project axially through the catalyzer unit 1. The catalyzer unit itself includes a carrying structure which is pierced with a multiplicity of passage ducts and in which the multiplicity of passage ducts are arranged in a matrix-like manner, preferably in each case in a hexagonal honeycomb pattern arrangement. A diagrammatic cross section through the hexagonal honeycomb structure is illustrated in the sectional illustration A-A. The passage ducts piercing the carrying structure of the catalyzer unit 1 are subdivided into two groups, of which the passage ducts 8 belonging to the first group are provided on the wall inside with a catalyst material and the passage ducts 9 belonging to the second group are formed of chemically largely inert material. As already mentioned above, the connecting lines 71 of the infeed 7 issue in each case into the passage ducts 8 which are equipped with catalyst material and in which the hydrogen-containing substance stream supplied is partly catalyzed. Directly adjacently to the passage ducts 8 extend the passage ducts 9 of the second group, through which is conducted pure supply air 10 which, on account of thermal coupling to the passage ducts 8 and of heat released therein, is heated during the exothermal catalyzed oxidation.

Downstream of the catalyzer unit 1, the multiplicity of individual partly catalyzed hydrogen/fuel mixture streams and the heated air streams emerge from the respective passage ducts of the catalyzer unit 1 and experience full intermixing, so that, even before entry into the combustion chamber 4, a homogeneously intermixed ignitable hydrogen/air mixture 11 is formed. To improve the degree of intermixing of the hydrogen/air mixture 11 formed, vortex generators 12 may optionally be provided, downstream of the catalyzer unit 1, along the burner 2. Furthermore, alternatively to or in combination with the vortex generators 12, swirl generators 13, as they are known, are provided, which, within the axially propagated hydrogen/air mixture 11, induce a swirl flow which, after passing into the combustion chamber 4, bursts open on account of the discontinuous widening of the flow cross section and ignites so as to form a stable flame front 14.

What have central importance in the use of pure hydrogen or of a highly reactive gas mixture with marked hydrogen fractions, are the catalyzer unit 1 and, in particular, the infeed 7, by which the hydrogen, together with a proportionate air flow, is fed into the respective passage ducts 8 lined with catalyst material. Thus, in this case, it is appropriate, in particular, to ensure that spontaneous ignitions of the hydrogen can be reliably ruled out. Furthermore, the oxidation of the hydrogen taking place along the passage ducts 8 is to occur in a controlled way, so that the entire hydrogen is not oxidized, but, instead, only a specific fraction of the hydrogen passing through the passage ducts 8, and therefore the heat released in this case does not lead to an overheating of the catalyzer unit 1. In this respect, FIG. 2 illustrates a preferred embodiment of a catalyzer unit with a specially designed infeed 7 for supplying hydrogen and air into the individual ducts 8 piercing the catalyzer unit.

Figure 2:
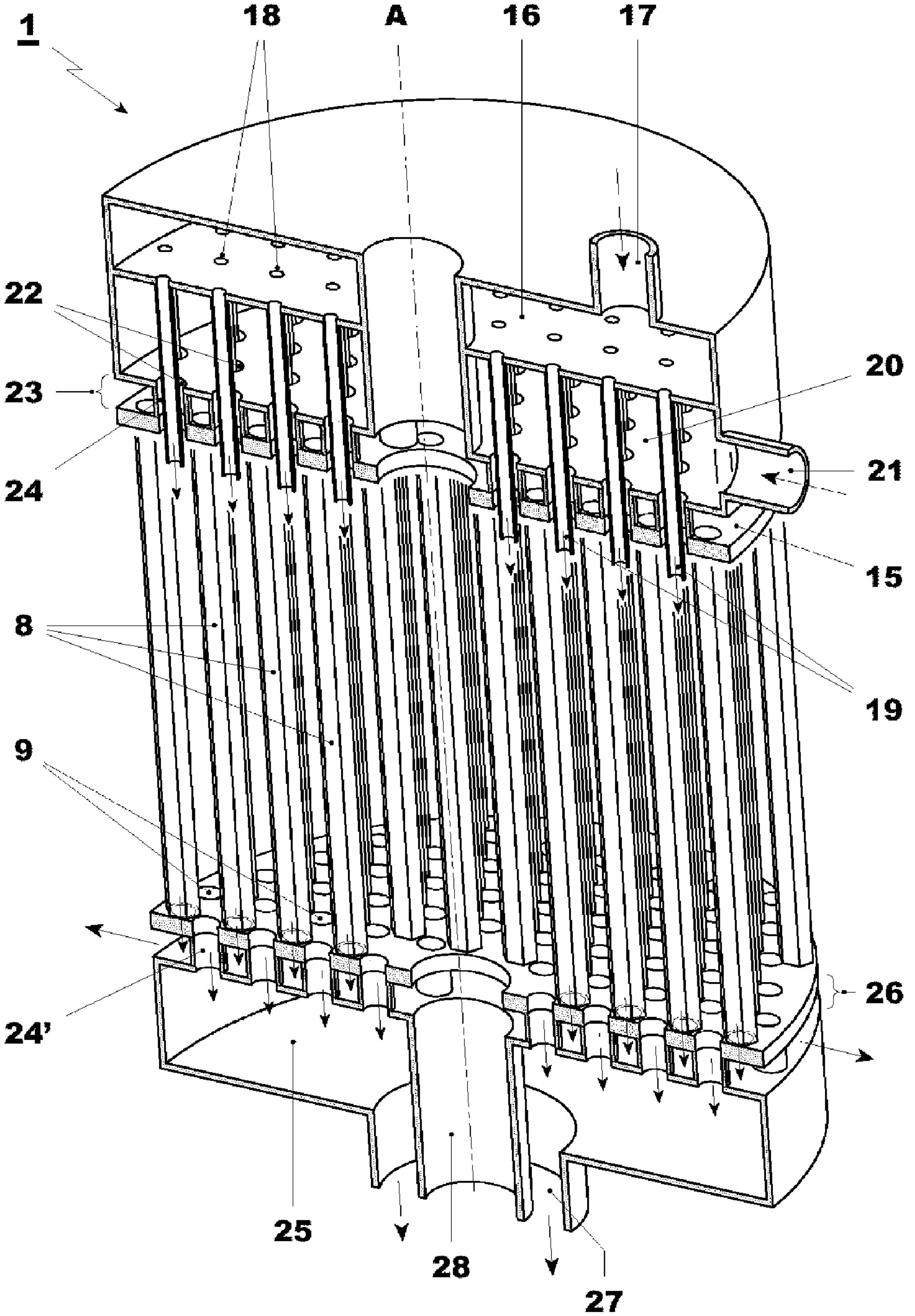
FIG. 2 shows a perspective sectional illustration through a catalyzer unit with a two-chamber system preceding in the flow direction and with a collecting volume following in the flow direction.

For greater clarity, FIG. 2 illustrates a perspective sectional image through a catalyzer unit 1 of this type in the axial longitudinal direction. The arrows depicted in FIG. 2 indicate the throughflow direction of the catalyzer unit and make clear the position in which a catalyzer unit 1 is to be integrated in a burner arrangement according to the diagrammatic illustration in FIG. 1. The catalyzer unit 1 includes a cylindrically designed carrying structure 15 which, as already mentioned above, is pierced by a multiplicity of individual passage ducts 8, 9, parallel to the mid-axis A. The passage ducts 8, 9, preferably designed with a hexagonal flow cross section, are subdivided into two groups, of which the first group of passage ducts 8 is lined on the wall inside with catalyst material, preferably platinum or a platinum/noble metal compound, and the second group of passage ducts 9, which are arranged directly adjacently to the passage ducts 8, includes largely chemically inert material. The heat-resistant carrying structure 15 preferably includes a metal resistant to high temperature, preferably of ceramic material, such as, for example, corodierite.

Upstream of the catalyzer unit 1 is provided an infeed 7 which includes two chambers and via which the infeed of hydrogen $H_2$ and of air into the passage ducts 8, in each case lined with catalyst material, takes place. In this case, the infeed 7 is designed as a cylindrical hollow body, the cylinder cross section of which is adapted to that of the catalyzer unit 1 and, furthermore, has a two-chamber system. A first chamber 16 of the infeed 7 provides a fuel supply line 17, via which hydrogen can be fed into the volume region of the first chamber 16. A bottom plate delimiting the first chamber 16 on one side is pierced with orifices 18, the arrangement of which corresponds exactly to that of the passage ducts 8 which are in each case lined with catalyst material. The orifices 18 are connected in a fluidtight manner via connecting lines 19 and issue, ending freely, within the respective passage ducts 8. In this case, they project through the volume of the second chamber 20 which follows axially directly below the first chamber 16. The second chamber 20 has, in the same way as the first chamber 16, a supply line 21 through which supply air enters the chamber volume of the second chamber 20. Supply air is already compressed by a compressor unit and consequently has temperatures of at least 350° C.

The bottom plate, axially facing the catalyzer unit 1, of the second chamber 20 also provides corresponding orifices 22 which are arranged, distributed, identically to the arrangement of the orifices 18 within the first chamber 16 and which have a larger orifice diameter than the orifices 18, so that the connecting lines 19 project centrally through the orifices 22.

Between the bottom plate of the second chamber 20 and that plane in which all the inlet orifices of the passage ducts 8 and 9 of the catalyzer unit 1 lie, an intermediate gap 23 is provided, through which a further air flow enters laterally, in order to feed supply air to the passage ducts 9 issuing in the open intermediate gap 23. In order to prevent the situation where hydrogen may enter the intermediate gap 23 via the connecting lines 19 ending freely within the passage ducts 8, the orifices 22 are connected in a fluidtight manner to the orifices of the passage ducts 8 via connecting lines 24 designed as hollow ducts. Thus, in each case, the connecting lines 19 project coaxially through the connecting lines 24, so that, between the two connecting lines, an annular duct is formed, through which the supply air delivered via the chamber 20 can be introduced into the respective passage ducts 8.

Within the passage ducts 8 lined with catalyst material, an intermixing of hydrogen and air takes place in a predetermined mixture ratio which is set in such a way that a hydrogen-rich hydrogen/air mixture is obtained along the flow propagated axially within the passage ducts.

Owing to the catalytically assisted exothermally occurring oxidation within the passage ducts 8, heat is released, which, on the one hand, can heat the partly catalyzed hydrogen/air mixture propagated along the passage ducts 8 and, on the other hand, likewise heats the airflow routed through the adjacent passage ducts 9.

Downstream of the catalyzer unit 1, the passage ducts 8, from which the partly catalyzed hydrogen/air mixture streams emerge, are connected via corresponding connecting lines 24' to a storage volume 25, into which all the individual part streams emerging from the passage ducts 8 are combined. However, the connecting ducts 24' also serve as spacer elements between the downstream end of the catalyzer unit 1, at which end all the outlet orifices of the passage ducts 8 and 9 lie in a common plane and are therefore arranged at a distance from the storage volume 25. The intermediate gap 26 formed between the lower end of the catalyzer unit 1 and the storage volume serves for the lateral escape of the heated part air flows which emerge from the passage ducts 9.

Finally, it is appropriate to generate an ignitable hydrogen/air mixture which is to be formed by a directed convergence of the air flow emerging laterally through the intermediate gap 26 and of the partly catalyzed hydrogen/fuel mixture flow emerging through the outlet orifice 27 of the storage volume 25. This purpose is served, with reference to the exemplary embodiment already illustrated in FIG. 1, by the vortex generators 12 and a flow router 13.

Furthermore, the catalyzer unit 1 and the components 7, 25 arranged upstream and downstream of the latter are pierced by a central passage duct 28, through which a fuel lance, not illustrated in any more detail, can be led in order to feed liquid fuel into the pre-mix region near the combustion chamber.

Figure 3:
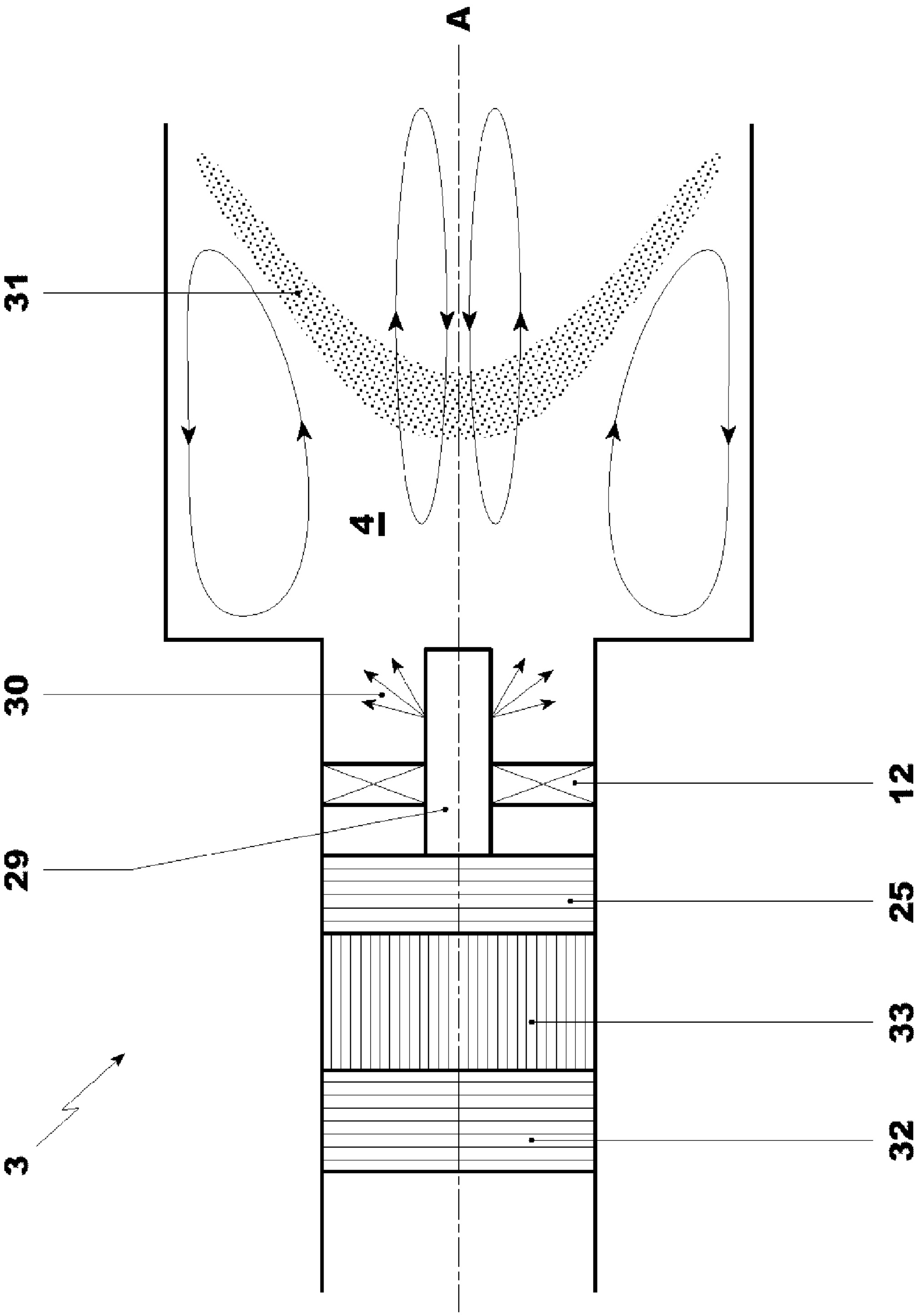
FIG. 3 shows a diagrammatic longitudinal sectional illustration through a burner arrangement.

In the longitudinal sectional illustration, illustrated diagrammatically in FIG. 3, through a burner arrangement with a following combustion chamber 4, the catalyzer unit 1 with the infeed 7 including upstream of two chambers and with the storage volume 25 mounted directly downstream of the catalyzer unit 1, is illustrated diagrammatically in the flow cross section of the premix region. The partly catalyzed hydrogen/air mixture, combined within the storage volume 25, passes via a central outflow duct 29 into the region upstream of the combustion chamber 4, parts of the partly catalyzed hydrogen/air mixture being discharged as part streams 30, laterally with respect to the flow direction, into the region of the air flow. The heated air flow emerging laterally from the intermediate gap 26 passes, downstream of the catalyzer unit 1, into vortex generators 12, with the result that an increased degree of intermixing is made possible between the radially supplied heated air flow and the centrally propagated hydrogen/air mixture flow. The ignitable hydrogen/fuel mixture thus experiences a depletion by dilution, with the result that the ignitability is lowered in such a way that the hydrogen/air mixture ignites and burns, so as to form a homogenous flame front 31, only within the combustion chamber 4. For reasons of flow stabilization, there may be provided within the premix region 3 of the burner arrangement swirl generators, not illustrated in FIG. 3, which assist a controlled bursting of the swirl flow formed, within the combustion chamber 4, so as to form a spatially stable backflow zone.

The exemplary embodiment illustrated in FIG. 3 shows that the heated air flow, after passing through the catalyzer unit, and the partly catalyzed hydrogen/fuel mixture formed within the catalyzer unit are routed, downstream of the catalyzer unit, as two separate substance streams, mutual intermixing taking place only after the heated air stream has passed through the vortex generator 12, so that the swirled heated air flow radially surrounds, as an annular swirled swirl flow, the centrally routed partly catalyzed hydrogen/air mixture flow and is ultimately intermixed with the latter so as to form a homogeneous hydrogen/fuel mixture.

It is likewise possible to operate the catalyzer unit illustrated in FIG. 2 in such a way that, downstream of the catalyzer unit, a central heated air stream combined via the collecting volume 25 is propagated axially in the flow direction and the respectively partly catalyzed hydrogen/fuel part streams are combined laterally via the gap 26 into an annular ring flow which annularly surrounds the central heated air stream and is ultimately intermixed with the latter. For this purpose, the catalyzer unit illustrated in FIG. 2 must be adapted structurally to the corresponding flow conditions in that the passage ducts 8 and 9 are to be interchanged.

In the already mentioned use of pure hydrogen as fuel, it is likewise possible to operate the arrangement described above with what are known as synthesis gases as fuel, these being obtained by coal gasification or oil gasification. Depending on the type of production, the gas mixtures consisting of hydrogen, carbon monoxide, and nitrogen have hydrogen fractions of at least 30%, so that the reactivity of gas mixtures of this type is determined essentially by the presence of hydrogen.

Principles of the present invention may suitably be embodied both in individual burner arrangements and in gas turbine plants with sequential combustion.

LIST OF REFERENCE SYMBOLS

1 Catalyzer unit
2 Burner inlet
3 Burner
4 Combustion chamber
5 Fuel supply line
6 Air supply line
7 Infeed
71 Connecting lines
8 Passage ducts of the first group
9 Passage ducts of the second group
10 Supply air stream
11 Hydrogen/air mixture
12 Vortex generator
13 Swirl generator
14 Flame front, back flow zone
15 Carrier structure of the catalyzer unit
16 First chamber
17 Fuel supply line

18 Orifices
19 Connecting lines
20 Second chamber
21 Air supply line
22 Orifices
23 Intermediate gap
24, 24'Connecting line
25 Collecting volume
26 Intermediate gap
27 Outlet orifice, outlet duct
28 Passage duct
29 Outflow duct
30 Part streams
31 Flame front While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for producing an ignitable fuel/air mixture, the fuel fraction of which consists essentially of a gas mixture containing hydrogen and which is to be burnt in a burner arrangement for driving a thermal engine, the method comprising:

combining a fuel flow and an air flow to form a fuel/air mixture flow, and providing a further air flow;

catalyzing part of the fuel/air mixture flow to form a partly catalyzed fuel/air mixture, during an exothermal, catalytically assisted reaction of the fuel, heat released from said reaction of the fuel at least partially heating the further air flow;

admixing the heated further air flow with the partly catalyzed fuel/air mixture to form an ignitable fuel/air mixture; and igniting and combusting the ignitable fuel/air mixture;

wherein the hydrogen-containing fuel has a hydrogen fraction of at least 30%.

2. The method as claimed in claim 1, wherein steam is formed by catalyzing part of the fuel/air mixture flow, and further comprising:

diluting the residual fraction of the noncatalyzed fuel/air mixture flow with said steam.

3. The method as claimed in claim 2, wherein the residual fraction enriched with steam contains about 25% $H_2$, 25% $H_2O$, and 50% $N_2$, and has temperatures in the range of between 700° C. and 1000° C.

4. The method as claimed in claim 1, further comprising:

heating by compression the air flow and the further air flow to a temperature of at least 350° C.

5. The method as claimed in claim 1, wherein the fuel/air mixture flow has a mixture ratio determined by the oxygen number λ, with $$0.1 \leqq \lambda \leqq 0.5,$$

λ defined as a ratio of the actual oxygen content to the minimum oxygen requirement for complete combustion.

6. The method as claimed in claim 1, further comprising:

dividing the further air flow and the fuel/air mixture flow into a multiplicity of separate part streams and introducing each part stream into a multiplicity of separate, thermally coupled flow ducts;

dividing the fuel/air mixture flow into a multiplicity of part streams each interacting with a catalyst material provided inside a flow duct assigned to each part streams and being partly catalyzed; and conducting the part streams of the heated further air flow and the part streams of the partly catalyzed fuel/air mixture from the flow ducts downstream.

7. The method as claimed in claim 6, wherein conducting the part streams comprises conducting each of the multiplicity of part streams of the heated further air flow and of the multiplicity of part streams of the partly catalyzed fuel/air mixture emerge from the flow ducts in the same flow direction, mutually intermixing the part streams directly downstream of the flow ducts, and forming the ignitable fuel/air mixture.

8. The method as claimed in claim 6, wherein conducting the part streams comprises conducting each of the multiplicity of part streams of the heated further air flow and of the multiplicity of part streams of the partly catalyzed fuel/air mixture, after passing though the flow ducts, into two flow regions spatially separated from one another, the two flow regions including a first flow region, into which the multiplicity of part streams of the heated further air flow enter, and a second flow region, into which the multiplicity of part streams of the partly catalyzed fuel/air mixture enter, and conducting each of the heated further air flow and the partly catalyzed fuel/air mixture from the two flow regions to form the ignitable fuel/air mixture.

9. The method as claimed in claim 8, further comprising:

twisting the heated further air flow after emerging from the first flow region and before said admixing, into a vortex for improving intermixing or into a swirl for flow stabilization; or twisting the partly catalyzed fuel/air mixture, after emerging from the second flow region and before said admixing, into a vortex for improving intermixing or into a swirl for flow stabilization;

or both.

10. The method as claimed in claim 8, wherein conducting comprises conducting the partly catalyzed fuel/air mixture from the second flow region in the form of a unitary flow or of a multiplicity of individual flows; and wherein admixing comprises admixing the heated further air flow as an annular flow to and radially around the partly catalyzed fuel/air mixture flow, downstream of the flow regions.

11. The method as claimed in claim 10, wherein conducting comprises feeding portions of the partly catalyzed fuel/air mixture flow into the annular flow of the heated further air flow at a non-zero angle with respect to the flow direction of the partly catalyzed fuel/air mixture flow.

12. The method as claimed in claim 1, wherein the hydrogen-containing gas mixture is a synthesis gas obtained by coal gasification or residual oil gasification.

13. The method as claimed in claim 1, wherein the thermal engine is a gas turbine plant.

14. An apparatus for producing an ignitable fuel/air mixture for operating a burner of a thermal engine, the apparatus comprising:

at least one catalyzer unit configured to be arranged upstream of the burner, the unit having a multiplicity of identically oriented passage ducts, the multiplicity of ducts comprising a first group provided on a duct wall inside with a catalyst material, and a second group of chemically largely-inert material;

a first infeed configured and arranged to introduce a fuel/air mixture upstream into the passage ducts of the first group;

a second infeed configured and arranged to introduce air upstream into the passage ducts of the second group;

a combustion chamber downstream of the at least one catalyzer unit;

wherein the first infeed has at least two chambers separated from one another, including a first chamber having a fuel supply line and a second chamber having an air supply line; and wherein the first chamber and the second chamber each include connecting lines issuing in pairs in the passage ducts of the first group.

15. The device as claimed in claim 14, wherein the connecting lines each run coaxially with respect to one another to the first chamber and to the second chamber.

16. The device as claimed in claim 14, wherein the connecting lines to the first chamber each partially project into a passage duct, and wherein the connecting ducts to the second chamber are each connected, flush, upstream to a passage duct and surround the respective connecting line to the first chamber, or wherein the connecting ducts to the first chamber are each connected, flush, upstream to a passage duct and surround the respective connecting line to the second chamber.

17. The device as claimed in claim 14, wherein the first infeed is arranged axially distant from the catalyzer unit, forming an intermediate gap between the first infeed and inlets, lying in one plane, of the passage ducts of the second group, said intermediate gap serving as a second infeed via which air can pass by lateral inflow into the intermediate gap and into the passage ducts of the second group.

18. The device as claimed in claim 14, further comprising:

a collecting volume having an outlet orifice with a mid-axis oriented in the throughflow direction of the passage ducts or with a mid-axis inclined with respect to said throughflow direction, wherein downstream outlets of the passage ducts of the first group issue in a fluidtight manner in the collecting volume; and a radially open intermediate gap between the collecting volume and outlets, lying in one plane, of the passage ducts of the second group.

19. The device as claimed in claim 18, further comprising:

a centrally open passage duct though which a fuel lance for liquid fuel can be introduced; and wherein the first infeed, the second infeed, the catalyzer unit, and the collecting volume surround the centrally open passage duct.

20. The device as claimed in claim 14, wherein the first group and the second group of passage ducts are arranged in a spatially periodic ordered pattern.

21. The device as claimed in claim 20, wherein the first group and the second group are arranged alternately in each case in rows, in columns, or in a checkerboard pattern.

22. The device as claimed in claim 14, wherein the passage ducts of the first group and the second group are shaped and arranged in a hexagonal honeycomb pattern.

* * * * *